(12) United States Patent
Mandviwala et al.

(10) Patent No.: US 9,651,706 B2
(45) Date of Patent: May 16, 2017

(54) FIBEROPTIC TUNED-INDUCTION SENSORS FOR DOWNHOLE USE

(71) Applicant: HALLIBURTON ENERGY SERVICES, INC., Houston, TX (US)

(72) Inventors: Tasneem A. Mandviwala, Katy, TX (US); Matthew Chase Griffing, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 54 days.

(21) Appl. No.: 14/712,758

(22) Filed: May 14, 2015

(65) Prior Publication Data

US 2016/0334534 A1   Nov. 17, 2016

(51) Int. Cl.
*G01V 3/28* (2006.01)
*G01H 9/00* (2006.01)
*G01V 3/30* (2006.01)

(52) U.S. Cl.
CPC ............. *G01V 3/28* (2013.01); *G01H 9/004* (2013.01); *G01V 3/30* (2013.01)

(58) Field of Classification Search
CPC ............. G01V 3/10; G01V 3/28; G01V 3/34
See application file for complete search history.

(56) References Cited

U.S. PATENT DOCUMENTS

| 4,360,272 A | 11/1982 | Schmadel et al. |
| 4,739,325 A | 4/1988 | MacLeod |
| 4,939,447 A * | 7/1990 | Bohnert ............... G01R 15/248 250/227.14 |
| 4,950,883 A | 8/1990 | Glenn et al. |

(Continued)

FOREIGN PATENT DOCUMENTS

| EP | 0212915 | 3/1987 |
| EP | 0856753 | 5/1998 |
| WO | 2008/124286 | 10/2008 |
| WO | 2012/061844 | 5/2012 |
| WO | 2012/075474 | 6/2012 |

(Continued)

OTHER PUBLICATIONS

PCT International Search Report and Written Opinion, Dated Nov. 5, 2014, Appl No. PCT/US2014/019228, "Optical Electric Field Sensors Having Passivated Electrodes," Filed Feb. 28, 2014, 14 pgs.

(Continued)

*Primary Examiner* — David M Gray
*Assistant Examiner* — Michael Harrison
(74) *Attorney, Agent, or Firm* — Iselin Law PLLC; John W. Wustenberg

(57) ABSTRACT

A method of sensing electromagnetic (EM) fields downhole may include filtering a voltage signal induced in a coil antenna by an EM field to produce a filtered signal, said filtering being performed by a resonance tuning filter, and applying the filtered signal to a piezoelectric element to modify a strain of an optical fiber. A sensing system may include a cable deployed downhole and coupled to an interface unit. The cable has an optical fiber coupled to an array of downhole sensors, each sensor having a coil antenna coupled by a resonance tuning filter to a piezoelectric element that modifies a strain in the optical fiber in accordance with a signal induced in the coil antenna by an electromagnetic field. The interface unit measures a backscattered light to monitor the signal from each sensor in the array.

18 Claims, 4 Drawing Sheets

(56) References Cited

U.S. PATENT DOCUMENTS

| | | | |
|---|---|---|---|
| 4,996,419 | A | 2/1991 | Morey et al. |
| 5,305,075 | A | 4/1994 | Bucholtz et al. |
| 5,317,576 | A | 5/1994 | Leonberger et al. |
| 5,511,083 | A | 4/1996 | D'Amato |
| 5,513,913 | A | 5/1996 | Ball et al. |
| 5,642,051 | A | 6/1997 | Babour et al. |
| 5,691,999 | A | 11/1997 | Ball et al. |
| 5,804,736 | A | 9/1998 | Klauder et al. |
| 5,844,927 | A | 12/1998 | Kringlebotn |
| 6,188,712 | B1 | 2/2001 | Jiang et al. |
| 6,271,766 | B1 | 8/2001 | Didden et al. |
| 6,325,153 | B1 | 12/2001 | Harrell |
| 6,534,986 | B2 | 3/2003 | Nichols |
| 6,597,481 | B1 | 7/2003 | Fatehi et al. |
| 6,630,658 | B1 | 10/2003 | Bohnert et al. |
| 6,731,114 | B1 | 5/2004 | Lagabrielle et al. |
| 6,961,601 | B2 | 11/2005 | Matthews et al. |
| 7,077,200 | B1 | 7/2006 | Adnan et al. |
| 7,183,777 | B2 | 2/2007 | Bristow et al. |
| 7,391,942 | B2 | 6/2008 | Loock et al. |
| 7,492,168 | B2 | 2/2009 | Ogilvy et al. |
| 7,673,682 | B2 | 3/2010 | Daily |
| 8,058,869 | B2 | 11/2011 | Cranch et al. |
| 8,165,178 | B2 | 4/2012 | Henderson et al. |
| 8,380,439 | B2 | 2/2013 | Lagmanson et al. |
| 2002/0063866 | A1 | 5/2002 | Kersey et al. |
| 2003/0038634 | A1 | 2/2003 | Strack |
| 2003/0094281 | A1 | 5/2003 | Tubel |
| 2003/0205083 | A1 | 11/2003 | Tubel et al. |
| 2004/0033017 | A1 | 2/2004 | Kringlebotn et al. |
| 2004/0056663 | A1* | 3/2004 | Sinclair ............. G01V 3/32 324/367 |
| 2004/0093950 | A1 | 5/2004 | Bohnert |
| 2004/0117119 | A1 | 6/2004 | West et al. |
| 2006/0250274 | A1 | 11/2006 | Mombourquette et al. |
| 2007/0126594 | A1 | 6/2007 | Atkinson et al. |
| 2007/0228288 | A1 | 10/2007 | Smith |
| 2008/0042636 | A1 | 2/2008 | Koste et al. |
| 2008/0317400 | A1 | 12/2008 | Petrov |
| 2009/0188665 | A1 | 7/2009 | Tubel et al. |
| 2009/0296755 | A1 | 12/2009 | Brown et al. |
| 2010/0271030 | A1 | 10/2010 | Reiderman et al. |
| 2011/0017512 | A1 | 1/2011 | Codazzu |
| 2011/0083838 | A1 | 4/2011 | Labrecque |
| 2011/0084696 | A1 | 4/2011 | Tenghamn et al. |
| 2011/0139447 | A1 | 6/2011 | Ramos et al. |
| 2011/0163891 | A1 | 7/2011 | Wilson et al. |
| 2012/0147924 | A1 | 6/2012 | Hall |
| 2012/0175513 | A1 | 7/2012 | Duncan et al. |
| 2012/0223717 | A1 | 9/2012 | Labrecque |
| 2012/0293179 | A1 | 11/2012 | Colombo et al. |
| 2013/0056197 | A1 | 3/2013 | Maida et al. |
| 2013/0118734 | A1 | 5/2013 | Csutak |
| 2013/0207857 | A1 | 8/2013 | Thomas |
| 2013/0249705 | A1 | 9/2013 | Sharp et al. |
| 2013/0279841 | A1 | 10/2013 | Joinson |
| 2014/0036628 | A1 | 2/2014 | Hill et al. |
| 2014/0222343 | A1* | 8/2014 | Samson ............. G01V 3/12 702/8 |

FOREIGN PATENT DOCUMENTS

| | | |
|---|---|---|
| WO | 2012/100217 | 7/2012 |
| WO | 2014/120305 | 8/2014 |
| WO | 2015/178878 | 11/2015 |

OTHER PUBLICATIONS

PCT International Search Report and Written Opinion, Dated Jan. 12, 2014, Appl No. PCT/US2013/067288, "Distributed Feedback Fiber Laser Strain Sensor Systems and Methods for Subsurface EM Field Monitoring," Filed Nov. 29, 2013, 16 pgs.

PCT International Search Report and Written Opinion, dated Feb. 17, 2015, Appl No. PCT/US2014/038552, "Optical Magnetic Field Sensor Units for a Downhole Environment," filed May 19, 2015, 15 pgs.

PCT International Search Report and Written Opinion, dated Feb. 4, 2015, Appl No. PCT/US2014/038542, "A Magnetic Induction Sensor with an Electro-Optical Transducer and Related Methods and Systems," Filed May 19, 2014, 17 pgs.

Ball, G A. et al., "Single- and Multipoint Fiber-Laser Sensors", IEEE Photonics Technology Letters, vol. 5, No. 2, Feb. 1993, 4 pgs.

Bergmann, Peter et al., "Surface-Downhole Electrical Resistivity Tomography Applied to Monitoring of CO2 Storage at Ketzin, Germany," Geophysics, vol. 77, No. 6, Nov.-Dec. 2012, pp. B253-B267.

Bhatia, Vikram et al., "Optical Fiber Long-Period Grating Sensors", Optics Letter, vol. 21, No. 9, May 1, 1996, 3 pgs.

Bristow, Q. et al., "A New Temperature, Capacitive-Resistivity, and Magnetic-Susceptibility Borehole Probe for Mineral Exploration, Groundwater, and Environmental Applications," Geological Survey of Canada, Technical Note No. 3, doi: 10.4095/289197, 2011, 13 pgs.

Carrigan, Charles R. et al., "Electrical resistance tomographic monitoring of CO2 movement in deep geologic reservoirs," International Journal of Greenhouse Gas Control, doi: 10.1016/j.ijggc.2013.04.016, 2013, pp. 401-408.

Cranch, Geoffrey A., "Distributed Feedback Fiber Laser Strain Sensors", IEEE Sensors Journal, vol. 8, No. 7, Jul. 2008, 12 pgs.

Deceuster, John et al., "Automated Identification of Changes in Electrode Contact Properties for Long-Term Permanent ERT Monitoring Experiments," Geophysics, vol. 78, No. 2 (Mar.-Apr. 2013), 2011, pp. E79-E94.

Douma, Marten et al., "A Capacitive-Coupled Ground Resistivity System for Engineering and Environmental Applications: Results of Two Canadian Field Tests," SEG Annual Meeting, Expanded Abstracts, 1994, pp. 559-561.

Grard, R. et al., "A Mobile Four-Electrode Array and Its Application to the Electrical Survey of Planetary Grounds at Shallow Depths," Journal of Geophysical Research, vol. 96, No. B3, Mar. 10, 1991, pp. 4117-4123.

Hibbs, A. D. et al., "Capacitive Electric Field Measurements for Geophysics," EAGE Conference and Exhibition incorporating SPE EUROPEC 2011, Vienna, Austria, Expanded Abstracts, 2011, 2 pgs.

Hibbs, Andrew et al., "New Electromagnetic Sensors for Magnetotelluric and Induced Polarization Geophysical Surveys," SEG Annual Meeting, Expanded Abstracts, 2012, 5 pgs.

Kiessling, Dana et al., "Geoelectrical Methods for Monitoring Storage: First Results from Cross-Hole and Surface-Downhole Measurements from the CO2Sink Test Site at Ketzin (Germany)," International Journal of Greenhouse Gas Control, 4, 2010, pp. 816-826.

Kuras, Oliver et al., "Capacitive Resistivity Imaging with Towed Arrays," Journal of Engineering and Environmental Geophysics, vol. 12, Issue 3, 2007, pp. 267-279.

Kuras, Oliver et al., "Fundamentals of the Capacitive Resistivity Technique," Geophysics, vol. 71, No. 3 (May-Jun. 2006), 2006, pp. G135-G152.

Labrecque, Douglas et al., "Assessment of Measurement Errors for Galvanic-Resistivity Electrodes of Different Composition," Geophysics, vol. 73, No. 2 (Mar.-Apr. 2008), 2008, pp. F55-F64.

MacNae, James, "Electric Field Measurements in Air," SEG Annual Meeting, Expanded Abstracts, 2010, pp. 1773-1777.

MacNae, James et al., "Near-Surface Resistivity Contast Mapping with a Capacitive Sensor Array and an Inductive Source," Geophysics, vol. 76, No. 2, (Mar.-Apr. 2011), 2011, pp. G13-G23.

Mwenifumbo, C. J. et al., "Field Evaluation of a New Borehole Resistivity Probe Using Capacitive Electrodes," Proceedings of the Symposium on the Applications of Geophysics to Engineering and Environmental Problems, 1999, pp. 859-867.

Mwenifumbo, C. Jonathan et al., "Capacitive Conductivity Logging and Electrical Stratigraphy in a High-Resistivity Aquifer, Boise Hydrogeophysical Research Site," Geophysics, vol. 74, No. 3 (May-Jun. 2009), 2009, pp. E125-E133.

(56) References Cited

OTHER PUBLICATIONS

Panissod, Cedric et al., "Recent Developments in Shallow-Depth Electrical and Electrostatic Prospecting Using Mobile Arrays," Geophysics, vol. 63, No. 5 (Sep.-Oct. 1998), pp. 1542-1550.

Petiau, Gilbert, "Second Generation of Lead-Lead Chloride Electrodes for Geophysical Applications," Pure and Applied Geophysics, 157, 2000, pp. 357-382.

Shima, Hiromasa et al., "Developments of Non-Contact Data Acquisition Techniques in Electrical and Electromagnetic Explorations," Journal of Applied Geophysics, 35, 1996, pp. 167-173.

Shima, Hiromasa et al., "Fast Imaging of Shallow Resistivity Structures Using a Multichannel Capacitive Electrode System," SEG Annual Meeting, Expanded Abstracts, pp. 377-380.

Tabbagh, Alain et al., "Determination of Electrical Properties of the Ground at Shallow Depth with an Electrostatic Quadrupole: Field Trials on Archaeological Sites," Geophysical Prospecting, 41, 1993, pp. 579-597.

Thiel, David V., "On Measuring Electromagnetic Surface Impedance—Discussions with Professor James R. Wait", IEEE Transactions on Antennas and Propagation, vol. 48, No. 10, 2000, pp. 1517-1520.

Timofeeev, V.M. et al., "A New Ground Resistivity Method for Engineering and Environmental Geophysics," Proceedings of the Symposium on the Applications of Geophysics to Engineering and Environmental Problems, 1994, pp. 701-715.

Tondel, Richard et al., "Remote Reservoir Monitoring in Oil Sands: From Feasibility Study to Baseline Datasets," CSEG-CSPG-CWLS GeoConvention, Expanded Abstracts, 2013, 5 pgs.

Tondel, Richard et al., "Reservoir Monitoring in Oil Sands: Developing a Permanent Cross-Well System," SEG Annual Meeting, Expanded Abstracts, 2011, pp. 4077-4081.

Zonge, Kenneth L. et al., "The Effect of Electrode Contact Resistance on Electric Field Measurements", 55th SEG Annual Meeting, Washington D.C., Expanded Abstracts, 1985, 8 pgs.

Coillot, Christophe et al, "Induction Magnetometers Principle, Modeling and Ways of Improvement", LPP Laboratory of Plasma Physics, France, Mar. 9, 2012, p. 45-65.

PCT International Search Report and Written Opinion, dated Oct. 21, 2016, Appl No. PCT/US2015/041580, "Electromagnetic Monitoring with Formation-Matched Resonant Induction Sensors," Filed Jul. 22, 2015, 19 pgs.

US Non-Final Office Action, dated Jan. 19, 2016, U.S. Appl. No. 13/756,601, "Distributed Feedback Fiber Laser Strain Sensor Systems and Methods for Subsurface EM Field Monitoring," filed Feb. 1, 2013, 22 pgs.

US Non-Final Office Action, dated Aug. 3, 2016, U.S. Appl. No. 13/756,601,"Distributed Feedback Fiber Laser Strain Sensor Systems and Methods for Subsurface EM Field Monitoring," filed Feb. 1, 2013, 23 pgs.

PCT International Preliminary Report on Patentability, dated Dec. 1, 2016, Appl No. PCT/US2014/038552, "Optical Magnetic Field Sensor Units for a Downhole Environment," Filed May 19, 2014, 12 pgs.

* cited by examiner

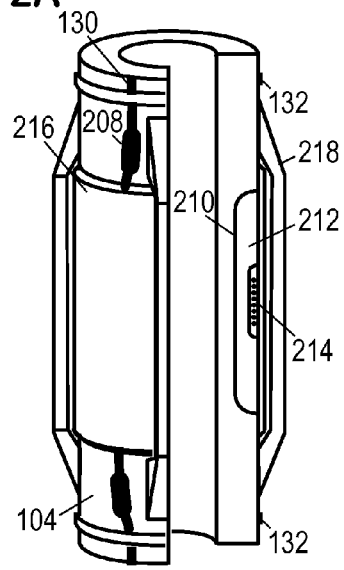
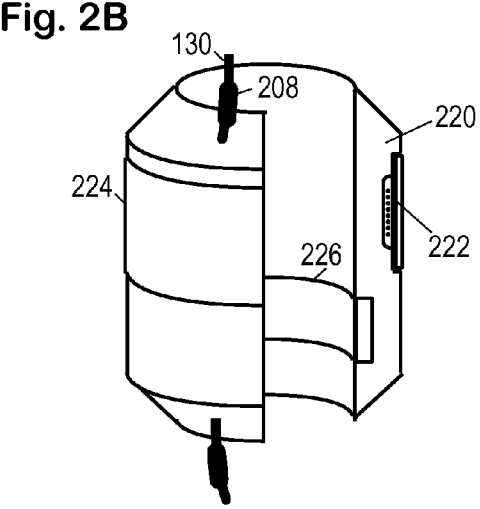
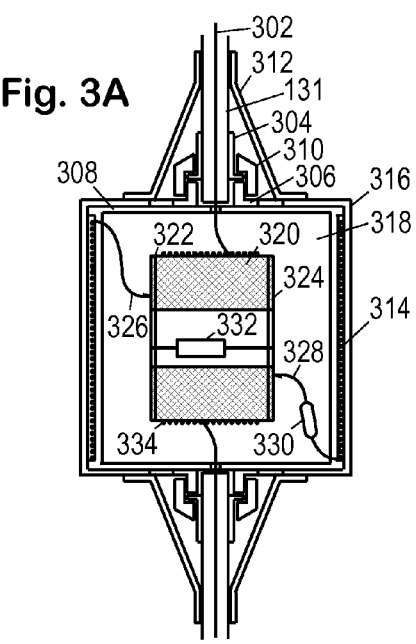
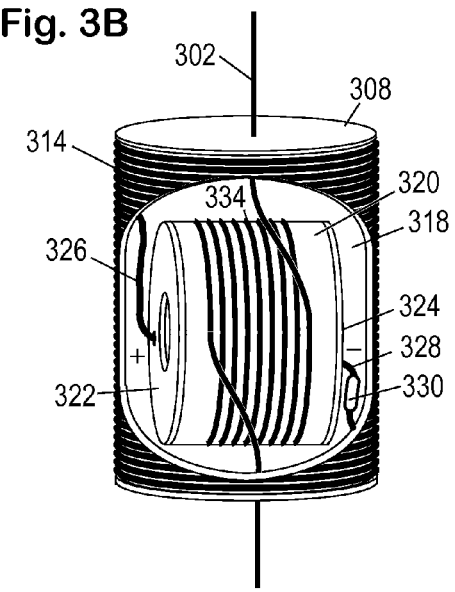

Fig. 4A
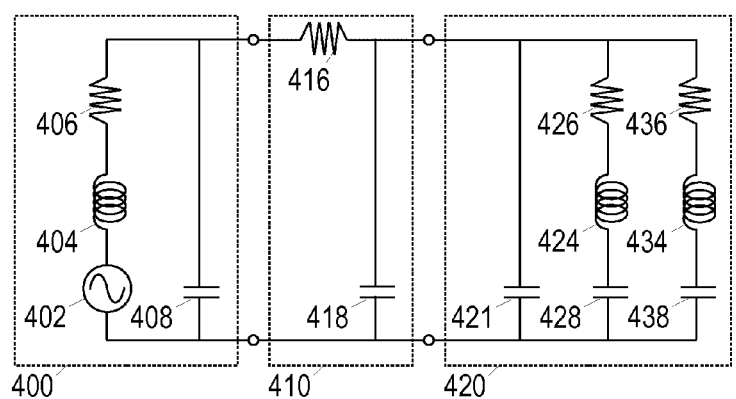
Fig. 4B
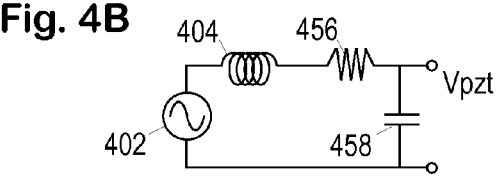
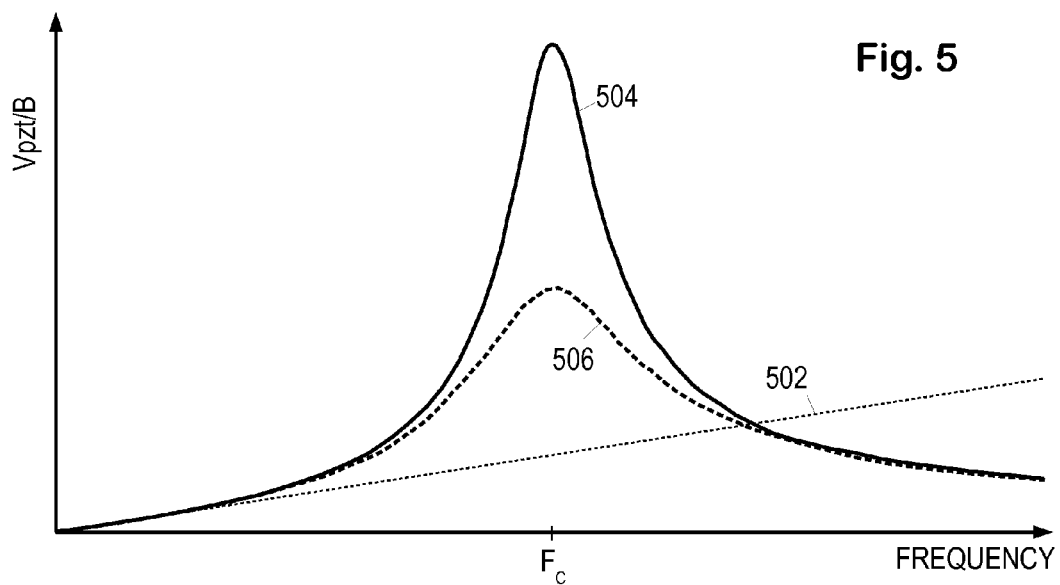
Fig. 5

FIBEROPTIC TUNED-INDUCTION SENSORS FOR DOWNHOLE USE

BACKGROUND

Oilfield operators seek to maximize hydrocarbon recovery within a given budget and timeframe. While they perform as much logging and surveying as feasible before and during the drilling and completion of production and, in some cases, injection wells, the information gathering process does not end there. The operators also wish to track the movement of fluids in and around the reservoirs, as this information enables them to adjust the distribution and rates of production among the producing and/or injection wells to avoid premature water breakthroughs and other obstacles to efficient and profitable operation. Moreover, such information gathering further enables the operators to better evaluate treatment and secondary recovery strategies for enhanced hydrocarbon recoveries.

Electromagnetic tomography offers one approach for mapping and monitoring fluid distributions between and around boreholes containing arrays of electromagnetic field transmitters and sensors. Yet the usefulness of electromagnetic tomography suffers due to a lack of sensitive, cost-effective transmitter and sensor designs robust enough to endure long term deployment in hostile downhole conditions.

BRIEF DESCRIPTION OF THE DRAWINGS

Accordingly, the drawings and the following description disclose one or more fiberoptic tuned-induction sensors and sensing methods suitable for downhole use. In the drawings:

FIGS. 2A-2B depict alternative embodiments of illustrative electromagnetic transmitters.

FIG. 3A is a cross-section view of an illustrative fiberoptic tuned-induction sensor.

FIG. 3B is a cut-away perspective view of illustrative windings in a fiberoptic tuned-induction sensor.

FIG. 4A is an equivalent circuit schematic of an illustrative fiberoptic tuned-induction sensor.

FIG. 4B is a simplified circuit schematic of an illustrative fiberoptic tuned-induction sensor.

FIG. 5 is a graph of sensitivity vs. frequency for different sensor configurations.

Figure 1:
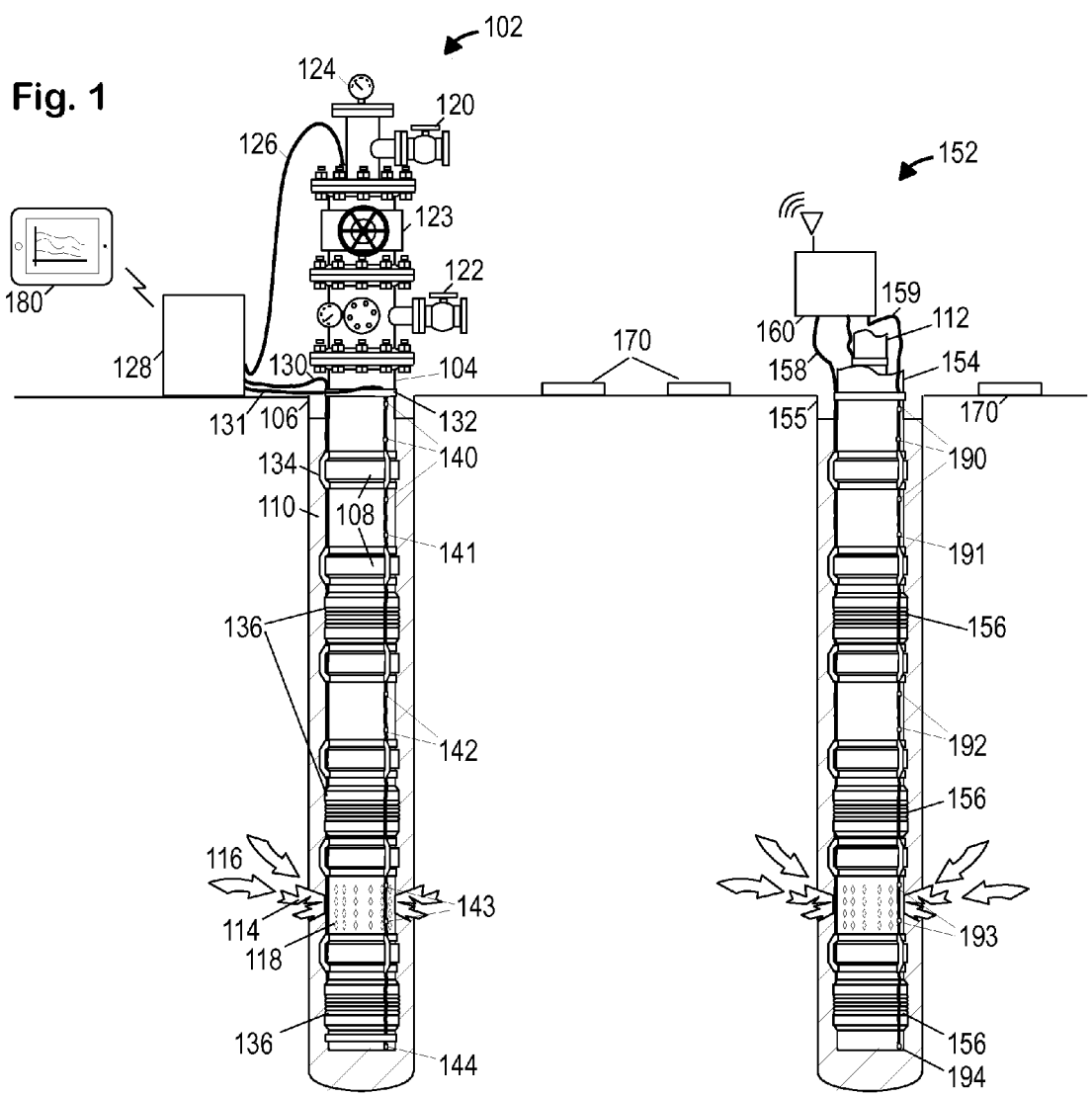
FIG. 1 depicts an illustrative permanent monitoring system.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The disclosed fiberoptic tuned-induction sensors, methods, and systems are best understood in an illustrative context. Accordingly, FIG. 1 shows an illustrative permanent EM monitoring system for a reservoir, with a first well 102 having a casing string 104 set within a borehole 106. The casing string includes multiple casing tubulars connected end-to-end by couplings 108. Alternative casing types include continuous steel or composite tubing. Cement 110 has been injected between an outer surface of the casing string 104 and an inner surface of the borehole 106 and allowed to set. The cement enhances the structural integrity of the well and seals the annulus around the casing against undesired fluid flows. Though well 102 is shown as entirely cemented, in practice certain intervals may be left without cement, e.g., in horizontal runs of the borehole where it may be desired to facilitate fluid flows.

Perforations 114 have been formed at one or more positions along borehole 106 to facilitate the flow of a fluid 116 from a surrounding formation into the borehole and thence to the surface. The casing string 104 may include pre-formed openings 118 in the vicinity of the perforations 114, or it may be perforated at the same time as the formation. Typically the well 102 is equipped with a production tubing string positioned in an inner bore of the casing string 104. (Well 152 shows just such a production tubing string 112 in the cut-away view.) One or more openings in the production tubing string accept the borehole fluids and convey them to the earth's surface and onward to storage and/or processing facilities via production outlet 120. The well head may include other ports such as port 122 for accessing the annular space(s) and a blowout preventer 123 for blocking flows under emergency conditions. Various other ports and feedthroughs are generally included to enable the use of external sensors 124 and internal sensors. Illustrative cable 126 couples such sensors to a well interface system 128. Note that this well configuration is merely for illustrative purposes, is not to scale, and is not limiting on the scope of the disclosure.

The interface system 128 typically supplies power to the transducers and provides data acquisition and storage, possibly with some amount of data processing. The permanent EM monitoring system includes EM transmitters and sensors coupled to the interface system 128 via one or more armored cables 130, 131, which are attached to the exterior of casing string 104 by straps 132 and protectors 134. (Protectors 134 guide the cables 130, 131 over the couplings 108 and shield the cable from being pinched between the coupling and the borehole wall.) Cable 130 connects to one or more EM transmitters 136 attached to the casing string 104, while cable 131 connects to one or more fiberoptic tuned-induction sensors 140-144.

FIG. 1 further shows a second well 152 having a second casing string 154 in a borehole 155, with one or more EM transmitter modules 156 attached to the casing string and communicating via a cable 158 to a second well interface system 160. The second well further includes a cable 159 having a downhole array of fiberoptic tuned-induction sensors 190-194 coupled to the second well interface system 160. The second well interface system 160 may be connected in a wired or wireless fashion to the first well interface system 128 or to a central system that coordinates the operation of the wells. Additional wells and well interfaces may be included in the coordinated operation of the field and the permanent EM monitoring system. (Some system embodiments employ EM sensors and transmitters in only one well, but it is generally preferred to provide additional EM sensors and transmitters on the surface and/or in other nearby wells.)

The illustrated system further includes surface transducer modules 170. The surface transducer modules 170 may employ spaced-apart electrodes that create or detect EM signals, wire coils that create or detect EM signals, or magnetometers or other EM sensors to detect EM signals. At least one of the EM transmitters 136, 156, 170 transmits periodic or transient (i.e., pulsed) EM signals while the EM sensors obtain responsive measurements.

FIG. 1 further shows a tablet computer 180 that communicates wirelessly with the well interface system 128 to obtain and process EM measurement data and to provide a representative display of the information to a user. The computer 180 can take different forms including a tablet, notebook, laptop, or portable form, a desktop computer, a server or virtual computer on a network, a mobile phone, or some combination of like elements that couple software-configured processing capacity to a user interface. Whichever computer embodiment is employed includes software that configures the computer's processor(s) to carry out the necessary processing and to enable the user to view and preferably interact with a display of the resulting information. The processing includes at least compiling a time series of measurements to enable monitoring of the time evolution, but may further include the use of a geometrical model of the reservoir that takes into account the relative positions and configurations of the transducer modules and inverts the measurements to obtain one or more parameters. Those parameters may include a resistivity distribution and an estimated water saturation.

The computer 180 may further enable the user to adjust the configuration of the transducers, employing such parameters as firing rate of the transmitters, firing sequence of the transmitters, transmit amplitudes, transmit waveforms, transmit frequencies, receive filters, and demodulation techniques. In some contemplated system embodiments, the computer further enables the user to adjust injection and/or production rates to optimize production from the reservoir.

FIG. 2A shows a partially-sectioned view of an illustrative EM transmitter. A recess 210 has been machined into the wall of the casing 104 and filled with the ferritic material 212. A coil antenna 214 overlays the ferritic material and is protected beneath a thin shell 216 of nonconductive, nonmagnetic material such as fiberglass. A plurality of nonmagnetic centralizing arms 218 further protects the transducer module. Electronics may be included in the module to derive power from the cable 130 and control the transmission process.

FIG. 2B is a partially-sectioned view of an alternative EM transmitter embodiment that can be slipped over the pin end of a casing tubular just before the tubular is connected to extend the casing string. The module can be secured in place with an adhesive or a clamp. The transmitter module's body 220 is primarily formed from the ferritic material, with a circumferential groove cut for the coil 222 and a protective shell 224. The body 220 further includes a recess 226 for electronics. Connectors 208 may be provided to facilitate connection of the cable 130.

FIG. 3A shows a cross-section of an illustrative fiberoptic tuned-induction sensor for detecting electromagnetic signals. FIG. 3B shows a cut-away perspective view of selected elements from the illustrative sensor. An optical fiber 302 from cable 131 is spliced or otherwise coupled to an optical fiber winding 334 around a cylindrical piezoelectric element 320. A flanged collar 304 secures to the cable 131 where it meets a threaded connector 306 on the sensor body 308. A threaded nut 310 secures the flanged collar 304 in a sealing fashion to the threaded connector 306. A boot 312 may also be provided with an adhesive filler material (such as a resilient sealant) to further secure the connection against fluid penetration.

In pass-through array configurations, the cable 131 continues from the opposite side of the sensor body 308, with a second flanged collar secured to a second threaded connector by a second nut sealed within a second boot. In an alternative, single-ended configuration, a reflective or absorbing termination is provided at the far end of the optical fiber winding 334. Typically, the single-ended sensors would each be coupled to the optical fiber 302 via a splitter that directs some fraction of the light into the sensor and passes the remaining light further along the cable 131 to other sensors in the array. The splitter also functions to return reflected or backscattered light from the sensor back along the cable to the interface unit.

In either case, a coil antenna 314 surrounds the sensor body 308 to convert electromagnetic fields into an induced voltage signal. (For this reason a coil antenna may alternatively be referred to as an induction magnetometer.) A cover 316 protects the coil antenna from mechanical damage and fluid intrusion. Both the cover 316 and the sensor body 308 preferably consist of a non-conductive material to avoid attenuating the response of the coil antenna 314. The sensor body's interior 318 accommodates a cylindrical piezoelectric element 320 having electrodes 322, 324 on opposing faces. Electrical leads 326, 328 respectively couple electrodes 322, 324 to the terminal points of coil antenna 314.

Electrodes 322, 324 impose the induced voltage signal across the piezoelectric element 320 in the form of an electrical field. The piezoelectric element 320 deforms in response to the electrical field, alternately expanding its diameter at the expense of its axial length and contracting its diameter in favor of lengthening along its axis. The diametrical expansion and contraction modifies the strain of the optical fiber winding 334. The changes in strain translate into slight variations of the optical fiber's index of refraction and length, which in turn translate into changes in the optical path length of the winding 334. These changes are detectable as variations in the travel time or phase of light signals returning from the sensor to the interface unit.

A tuning capacitance and optional damping resistance may be employed to tune the fiberoptic sensor, thereby placing a resonant peak of a desired bandwidth (e.g., 400 Hz) at a desired frequency (e.g., 2 kHz). The tuning capacitance may take the form of a discrete capacitor 332 wired between the electrodes 322, 324, thereby placing it in parallel with the piezoelectric element 320. The optional damping resistance may take the form of a discrete resistor 330 wired in series between one of the electrodes and the associated terminal point of the coil antenna. In an alternative embodiment, the optional damping resistance takes the form of a discrete resistor wired in parallel with the discrete capacitor, in which case a larger resistance would be used to provide the same amount of damping. (The parallel resistance would be $[1+Q^2]$ times the series resistance, where Q is the quality factor of the resonant circuit.) In either case, the resonant frequency may be chosen to correspond with a carrier frequency of a transmitted EM signal. Where a broadband transmit signal is employed, the sensors may be give different resonant frequencies to enable frequency division multiplexing of their responses. The damping resistance may be chosen to reduce the sensor's sensitivity to parameter drift.

In some contemplated sensor embodiments, the piezoelectric element 320 is a Noliac NAC2125-H20, with an outer diameter of 20 mm, an inner diameter of 12 mm, and a length of 20 mm. In the contemplated embodiments, the optical fiber winding is 96 turns (six meters) of Fibercore SM1500. To maximize the bending radius of the optical fiber, the axis of the cylindrical piezoelectric element may be turned perpendicular to the axis of the cylindrical sensor body 308. This configuration further avoids attenuation of the coil antenna response by induced currents in the electrodes 322, 324. To further enhance the response of the coil antenna 314, the remaining space in the sensor body interior 318 may be filled with a nonconductive, ferritic material or other material having a high relative magnetic permeability.

FIG. 4A shows an equivalent circuit for the fiberoptic tuned-inductance sensor. The circuit includes three partial circuits 400, 410, 420. Partial circuit 400 is the equivalent circuit for the coil antenna 314. Partial circuit 410 is the equivalent circuit for the resonance tuning filter. Partial circuit 420 is the equivalent circuit for the piezoelectric element 320.

Partial circuit 400 includes a voltage source 402 representing the voltage signal ("response signal") induced by the electromagnetic fields around the coil antenna 314. A series inductor 404 represents the inductance of the antenna's coil, while series resistor 406 represents the resistance of the coil. A capacitor 408 in parallel with the series combination of source 402, inductor 404, and resistor 406, represents the parasitic capacitance of the coil.

Partial circuit 410 includes a damping resistor 416 in series between a terminal of the coil antenna and a terminal of the piezoelectric element. The other terminal of the coil antenna is connected to the other terminal of the piezoelectric element. Partial circuit 410 further includes a tuning capacitor 418 between the terminals of the piezoelectric element. Partial circuit 410 modifies the resonance frequency of the piezoelectric element, operating in cooperation with the piezoelectric element to convert the response signal into a filtered signal.

Partial circuit 420 includes three parallel branches between the piezoelectric element terminals. The first branch is a capacitor 421 representing the intrinsic capacitance of the piezoelectric element. For the Noliac transducer, this is about 3.77 microfarads. The second branch is a series combination of a resistor 426, inductor 424, and capacitor 428, representing the mechanical resonance in hoop mode. For the Noliac transducer, the values are about 100 milliohms, 5.49 microhenries, and 1.86 microfarads. The third branch is also a series combination of a resistor 436, inductor 434, and capacitor 438, representing the mechanical resonance in axial mode. For the Noliac transducer, the values are about 1.5 ohms, 4.6 microhenries, and 1.37 microfarads.

With the following assumptions, the equivalent circuit of FIG. 4A may be simplified as shown in FIG. 4B. (1) The inductance of the antenna coil is much larger than the inductances associated with the mechanical resonances. (2) The parasitic capacitance of the antenna coil is much smaller than the intrinsic capacitance of the piezoelectric element. (3) The resistances associated with the mechanical resonances are small enough to be ignored (or they can be lumped into the damping resistance).

The resulting simplified circuit is a single loop having the source 402, inductor 404, an equivalent resistor 456, and an equivalent capacitor 458. The equivalent resistor 456 is the sum of resistors 406 and 416. The equivalent capacitor 458 is the sum of capacitors 418, 421, 428, and 438. Representing the operation of this circuit by the ratio of the voltage across the piezoelectric element $V_{pzt}$ to the voltage induced in the coil $V_{src}$ yields:

$$\frac{V_{pzt}}{V_{src}} = \frac{1}{(1 - LC(2\pi f)^2) + jRC(2\pi f)} \tag{1}$$

where L is the inductance of inductor 404, R is the resistance of resistor 456, C is the capacitance of capacitor 458, j is sqrt(−1), and f is the signal frequency. This relationship is verified by an exact simulation of the equivalent circuit.

To relate the voltage across the piezoelectric element to the electromagnetic field, we first note that magnetic flux density B is proportional to the magnetic field strength H:

$$B = \mu_0 H \tag{2}$$

where $\mu_0$ is the permeability of free space ($4\pi \ast 10^{-7}$ H/m). For an N-turn coil of cross-sectional loop area A, the voltage induced by a magnetic flux density B is:

$$V_{src} = -jNA\mu_{eff}2\pi fB \cos(\theta) \tag{3}$$

where $\mu_{eff}$ is the effective permeability of the material inside the coil and $\theta$ is the angle between the coil axis and the magnetic field direction. This in turn translates to a detector field sensitivity of:

$$\frac{V_{pzt}}{B} = \frac{-jNA\mu_{eff}(2\pi f)\cos(\theta)}{(1 - LC(2\pi f)^2) + jRC(2\pi f)}. \tag{4}$$

FIG. 5 compares three sensitivity graphs. Curve 502 represents the sensitivity of an antenna coil alone (i.e., Vsrc/B). Curve 504 represents the sensitivity of the fiberoptic tuned inductance sensors represented by the equivalent circuits above. Note that the use of resonance significantly amplifies the sensor's response to EM fields, at least within the chosen frequency band. Curve 506 represents the sensitivity of the same sensor with an increased damping resistance. The resonance frequency (i.e., the frequency at which the peaks occur) is $$f_c = \frac{1}{2\pi\sqrt{LC}} \tag{5}$$

while the 3 dB bandwidth of the peak is $$BW = f_c R \sqrt{\frac{C}{L}} = \frac{R}{2\pi L} \tag{6}$$

Simulating the drift of material and electrical parameters that may be expected for a wide variation in sensor temperature with a nominal damping resistance of 1 ohm, the resonance frequency was observed to drop from 2 kHz to 1.8 kHz as the temperature increased from 100° C. to 150° C. while the bandwidth (400 Hz) and peak sensitivity (about 7.3) remained essentially constant.

Figure 6:
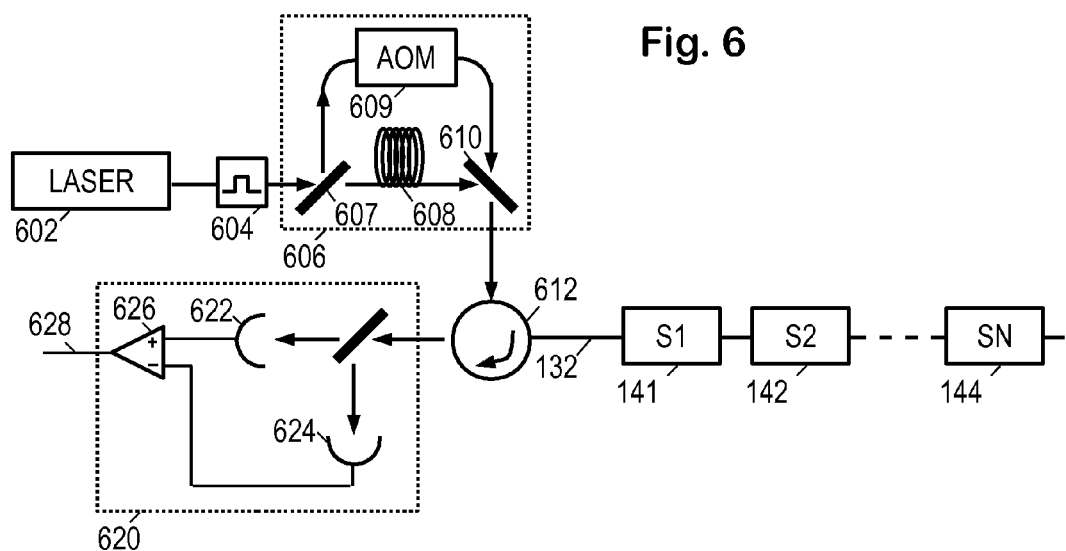
FIG. 6 shows an illustrative optical sensor interrogation system.

FIG. 6 shows one illustrative interrogation system that may operate as part of interface unit 128 for measuring the responses of the fiberoptic tuned-inductance sensors 141-144 to electromagnetic fields, in terms of their effects on the optical fiber in cable 132. The cable 132 is coupled to a circulator 612 in the interface unit 128 (FIG. 1) to receive a sequence of interrogation light pulses and to provide a return signal. The interface unit 128 generates the interrogation light pulses using a continuous laser 602 and a gate 604 to form a sequence of pulses with a spacing that exceeds the two-way travel time between the first and last optical sensing transducers 140, 144. (Alternative pulse generator configurations may employ a semiconductor optical amplifier, or "SOA".)

A compensator 606 includes a first beam splitter 607 to direct each light pulse along two optical paths and a second beam splitter 610 to recombine the light from the two paths. As the optical paths have different propagation times, each pulse is converted into a double pulse. One of the pulses is slightly shifted in frequency due to the presence of an acousto-optic modulator 609 on one path. The other optical path provides an optical delay 608 relative to the first path to create the double-pulse. The total width of the double pulse should not exceed the minimum two-way travel time between adjacent transducers.

Light pulses propagating along the cable 132 encounter scattering imperfections in the optical fiber, causing a small fraction of the light to return from each point along the fiber to the circulator 612 with a delay that corresponds to the position of the scattering imperfections at that point. The light received at the circulator is a combination of the light scattered from the two pulses in the pulse pair, which light interferes constructively or destructively depending on its phase difference. A receiver 620 measures this interfering light, producing a signal 628 that represents the phase difference. Signal 628 may be generated using a 180° power combiner 626 that differences the signals from two photodetectors 622, 624 which are sensing the transmitted and reflected light components from a beam splitter.

Aside from a linearly-varying phase offset provided by the acousto-optic modulator 609, the phase difference associated with the segment of optical fiber between the two scattering points associated with the pulse pair is a function of the strain in that fiber segment. By dividing the measurement signal into windows for each segment and tracking the phase from each window as a function of time, the interface unit can monitor the strain as a function of time for each segment. (Coherent demodulation is used to remove the varying phase offset introduced by the acousto-optic modulator). For those segments including a transducer, the strain measurement represent the filtered sensor responses to the electromagnetic fields in the coil antennas.

We note here that the strain in other segments may also be tracked to provide distributed monitoring of other parameters affecting the strain, e.g., pressure, temperature. Additional discrete transducers may also be included for sensing other downhole parameters, e.g., acoustic signals, chemical species concentrations, magnetic fields, etc. Although the illustrative systems show only three transducers, in principle the only limits on the number of transducers is imposed by the attenuation of light propagating along the fiber. Certain contemplated embodiments include hundreds of fiberoptic tuned-inductance sensors on a given optical fiber.

Other suitable fiberoptic interrogation systems are known and may be used to measure the fiber strains created by each tuned-induction sensor and responsively derive the EM field measurements. Such interrogation systems may employ other techniques for performing interferometric measurements of the piezoelectric element's effects on the optical fiber coil, including the use of in-line partial reflectors (like fiber Bragg gratings or mirrors), and further including alternative interferometric circuit configurations (like Fabry-Perot, Michelson, Mach-Zender, and Sagnac) for the sensor array. For each of these, the interface unit may coordinate the operation of the interrogation system with the operation of the EM transmitters as discussed further below.

Figure 7:
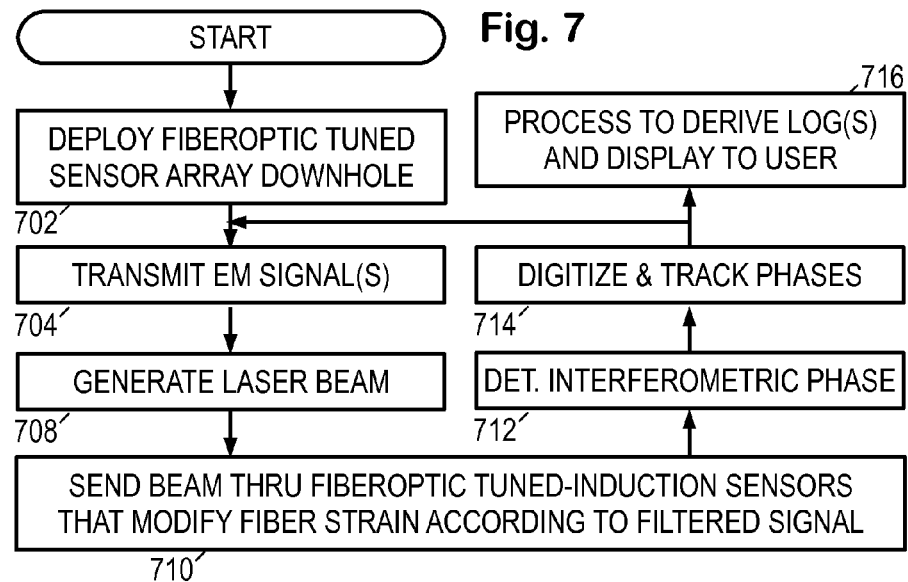
FIG. 7 is a flow chart of an illustrative fiberoptic tuned-induction sensing method.

FIG. 7 is a flow diagram of an illustrative EM monitoring method using fiberoptic tuned-induction sensors. The method begins in block 702 with a crew deploying a fiberoptic sensing cable with an integrated array of tuned-induction sensors downhole. In at least some embodiments, the cable is strapped to a casing string as the casing string is assembled and lowered into a borehole before being cemented in place. The crew may further complete the well, performing any needed perforation, treatment, equipping, and conditioning operations to optimize production. The well may alternatively be an injection well or a "dry well" created solely for monitoring.

Alternative deployments are also contemplated, including integration into a wired drillstring for logging while drilling, and further including deployment in as part of a wireline supporting a wireline sonde. The tuned-induction sensors are coupled to optical fiber for interrogation, though the optical fiber may be part of a cable that also transports electrical power for transmitters and may further provide pathways for digital telemetry. Once deployment is complete, the optical fiber is attached to an interface unit for interrogation.

In block 704, the interface unit activates one or more selected EM transmitters. In some embodiments, the EM transmitters are activated in turn so that only one at a time is operating. In other embodiments, the EM transmitters are configured to modulate their signals in distinguishable fashion (e.g., using frequency or code division multiplexing), permitting multiple EM transmitters to operate at once. Some embodiments contemplate the use of a broadband signal or a swept carrier frequency for at least the initial activation of each transmitter, thereby enabling the interface unit to identify the resonance frequency of each transducer and optionally adapt subsequent EM transmissions accordingly.

In block 708, the interface unit generates a laser beam that may be optionally pulsed or modulated to enable multiplexing of responses from multiple transducers in the return signal. In block 710 the one or more tuned-induction sensors modify the strain in the optical fiber, thereby modifying the travel time and phase of the passing light in accordance with filtered signal derived from the coil antenna response to EM fields. In block 712, the interface unit measures the modified light, preferably using an interferometric phase measurement. In block 714, the interface unit digitizes the measurement signal and associates the measurements with the various sensors. The interface unit repeats blocks 704-714 to measure the response of each sensor to each transmitter, and further to track these responses as a function of time. In block 716, the measurements are processed to derive logs of the EM fields measured by each sensor or related measurements such as tomographic maps of formation impedance, logs of fluid front distance, etc., which are then displayed to a user to enable long term monitoring of the reservoir status. Block 716 may be performed by a separate processing unit coupled to the interface unit.

The fiberoptic tuned-induction sensor array has low power requirements, making it intrinsically safe, compliant with various oilfield-related electrical standards including the intelligent well interface standard (IWIS), and particularly suitable for offshore well environments having limited available power from subsea installations. In at least some embodiments, the transmitters may be located downhole and powered from batteries, downhole turbines, or other integrated power sources. The system is also suitable for use in acidic or basic high pressure and high temperature environments and can tolerate continuous vibration over an extended period.

Accordingly, among the embodiments disclosed herein are:

A: An electromagnetic sensor for downhole use, the sensor comprising: a coil antenna that generates a response signal from an electromagnetic field; a resonance tuning filter that converts the response signal into a filtered signal; a piezoelectric element that deforms in response to the filtered signal; and an optical fiber mechanically coupled to the piezoelectric element, wherein the piezoelectric element modifies a strain of the optical fiber in accordance with the filtered signal.

B: A method of sensing electromagnetic fields downhole, the method comprising: filtering a voltage signal induced in a coil antenna by an electromagnetic field to produce a filtered signal, said filtering being performed by a resonance tuning filter; and applying the filtered signal to a piezoelectric element to modify a strain of an optical fiber.

C: An electromagnetic sensing system that comprises: a cable disposed along a borehole, said cable having an optical fiber coupled to an array of downhole electromagnetic field sensors, each sensor having a coil antenna coupled by a resonance tuning filter to a piezoelectric element that modifies a strain in the optical fiber in accordance with a signal induced in the coil antenna by an electromagnetic field; and an interface unit that transmits light pulses along the optical fiber and measures an interferometric signal phase from backscattered light to monitor the signal from each sensor in the array.

Each of the embodiments A, B, and C, may have one or more of the following additional features in any combination: (1) the optical fiber is coupled to an interface unit that transmits light pulses and measures backscattered light to monitor the filtered signal. (2) the piezoelectric element is cylindrical. (3) the optical fiber is wound around the piezoelectric element. (4) the filtered signal is applied as an electrical field parallel to an axis of the cylindrical piezoelectric element. (5) the filtered signal is applied as an electrical field parallel to a radius of the cylindrical piezoelectric element. (6) the coil antenna is wound around a shell containing the piezoelectric element. (7) the shell further contains ferromagnetic material to enhance the response of the coil antenna. (8) the resonance tuning filter comprises a tuning capacitor that adjusts a resonance frequency of the piezoelectric element to a desired frequency. (9) the resonance tuning filter comprises a damping resistance that adjusts a response bandwidth of the piezoelectric element. (10) the shells of the sensors are anchored to or integrated with the cable. (11) the method or usage of the sensor includes transmitting light pulses via the optical fiber; and deriving an interferometric signal phase from backscattered light to monitor the filtered signal.

Numerous variations and modifications will become apparent to those skilled in the art once the above disclosure is fully appreciated. For example, the figures show system configurations suitable for reservoir monitoring (particularly in response to enhanced oil recovery operations or steam assisted gravity drainage), but they are also readily usable for treatment operations, cementing operations, annular fluid monitoring, and $CO_2$ or wastewater sequestration monitoring. Though the foregoing disclosure focuses on permanent monitoring, the disclosed techniques can also be readily adapted to wireline and logging-while-drilling applications. The ensuing claims are intended to cover such variations where applicable.

What is claimed is:

1. An electromagnetic sensor for downhole use, the sensor comprising:
    a coil antenna that generates a response signal from an electromagnetic field;
    a resonance tuning filter that converts the response signal into a filtered signal;
    a piezoelectric element that deforms in response to the filtered signal; and
    an optical fiber mechanically coupled to the piezoelectric element,
    wherein the piezoelectric element modifies a strain of the optical fiber in accordance with the filtered signal;
    wherein the coil antenna is wound around a shell containing the piezoelectric element.

2. The sensor of claim 1, wherein the optical fiber is coupled to an interface unit that transmits light pulses and measures backscattered light to monitor the filtered signal.

3. The sensor of claim 1, wherein the piezoelectric element is cylindrical, and wherein the optical fiber is wound around the piezoelectric element.

4. The sensor of claim 3, wherein the filtered signal is applied as an electrical field parallel to an axis of the piezoelectric element.

5. The sensor of claim 3, wherein the filtered signal is applied as an electrical field parallel to a radius of the piezoelectric element.

6. The sensor of claim 5, wherein the shell further includes ferromagnetic material.

7. The sensor of claim 1, wherein the resonance tuning filter comprises a tuning capacitor that adjusts a resonance frequency of the piezoelectric element to a desired frequency.

8. The sensor of claim 7, wherein the resonance tuning filter further comprises a damping resistance that adjusts a response bandwidth of the piezoelectric element.

9. A method of sensing electromagnetic fields downhole, the method comprising:
    filtering a voltage signal induced in a coil antenna by an electromagnetic field to produce a filtered signal, said filtering being performed by a resonance tuning filter; and
    applying the filtered signal to a piezoelectric element to modify a strain of an optical fiber;
    wherein the coil antenna is wound around a shell containing the piezoelectric element.

10. The method of claim 9, further comprising:
    transmitting light pulses via the optical fiber; and
    deriving an interferometric signal phase from backscattered light to monitor the filtered signal.

11. The method of claim 9, wherein the piezoelectric element is cylindrical, and wherein the optical fiber is wound around the piezoelectric element.

12. The method of claim 11, wherein said applying includes coupling the filtered signal to electrodes on opposite ends of the piezoelectric element.

13. The method of claim 11, wherein said applying includes coupling the filtered signal to radially-separated electrodes of the piezoelectric element.

14. The method of claim 9, wherein said inducing includes concentrating electromagnetic field lines with ferromagnetic material in said shell.

15. The method of claim 9, wherein as part of said filtering, the resonance tuning filter provides the piezoelectric element with a modified resonance frequency.

16. An electromagnetic sensing system that comprises:
    a cable disposed along a borehole, said cable having an optical fiber coupled to an array of downhole electromagnetic field sensors, each sensor having a coil antenna coupled by a resonance tuning filter to a piezoelectric element that modifies a strain in the optical fiber in accordance with a signal induced in the coil antenna by an electromagnetic field; and an interface unit that transmits light pulses along the optical fiber and measures an interferometric signal phase derived from backscattered light to monitor the signal from each sensor in the array.

17. The system of claim 16, wherein each sensor has the coil antenna wound around a shell containing the piezoelectric element, and wherein the shells are anchored to or integrated with the cable.

18. The system of claim 17, wherein each shell includes ferromagnetic material to enhance sensitivity of the sensor's coil antenna.

\* \* \* \* \*